US012680583B2

(12) United States Patent
Shahin

(10) Patent No.: US 12,680,583 B2
(45) Date of Patent: Jul. 14, 2026

(54) BRAKE CALIPER ASSEMBLY HAVING GUIDE PIN WITH NON-CIRCULAR CROSS-SECTION

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 391 days.

(21) Appl. No.: 18/233,157

(22) Filed: Aug. 11, 2023

(65) Prior Publication Data

US 2024/0271673 A1     Aug. 15, 2024

(30) Foreign Application Priority Data

Feb. 10, 2023    (DE) .......................... 102023103289.5

(51) Int. Cl.
*F16D 55/227*          (2006.01)
*F16D 55/2265*        (2006.01)
(Continued)

(52) U.S. Cl.
CPC ..... *F16D 55/22655* (2013.01); *F16D 55/227* (2013.01); *F16D 65/0068* (2013.01);
(Continued)

(58) Field of Classification Search
CPC ............. F16D 55/22655; F16D 55/227; F16D 65/0068; F16D 65/0087; F16D 2055/0016; F16D 2055/007; B60T 1/065
(Continued)

(56) References Cited

U.S. PATENT DOCUMENTS 4,685,686 A  *  8/1987  Weiler ..................... F16J 15/52
                                                          403/50
5,657,837 A  *  8/1997  Yamadera ............. F16D 55/227
                                                          188/73.44
(Continued)

FOREIGN PATENT DOCUMENTS

CN          102979841 A  *  3/2013  ........... F16D 65/095
CN          207569008 U      7/2018
(Continued)

OTHER PUBLICATIONS

German Patent and Trademark Office, German Patent Application No. 102023103289.5, Office Action dated Jan. 22, 2024, 11 pages.

*Primary Examiner* — Christopher P Schwartz
(74) *Attorney, Agent, or Firm* — LEE, HONG, DEGERMAN, KANG & WAIMEY

(57)                ABSTRACT
The invention concerns a guide pin for a brake caliper assembly and a brake caliper assembly for a vehicle disc brake, the vehicle disc brake comprising a brake disc that rotates about a rotation axis, the brake caliper assembly comprising: a brake caliper housing having a receiving section for a brake piston; a brake pad carrier configured to slidingly receive a pair of brake pads; and at least one guide pin configured to guide a relative movement between the brake caliper housing and the brake pad carrier. At least a first section of the guide pin has a cross-section comprising a main axis and a minor axis. A dimension of the cross-section along the main axis is longer than along the minor axis. An angle enclosed by the main axis and a radial direction is smaller compared to an angle enclosed by the minor axis and the radial direction.

9 Claims, 6 Drawing Sheets

(51) Int. Cl.
  F16D 65/00    (2006.01)
  *B60T 1/06*     (2006.01)
  *F16D 55/00*    (2006.01)

(52) U.S. Cl.
  CPC .......... F16D 65/0087 (2013.01); *B60T 1/065*
    (2013.01); *F16D 2055/0016* (2013.01); *F16D*
               *2055/007* (2013.01)

(58) Field of Classification Search
  USPC ........................................... 188/73.44, 73.45
  See application file for complete search history.

(56)         References Cited

U.S. PATENT DOCUMENTS

| | | | |
|---|---|---|---|
| 6,026,938 A * | 2/2000 | Demoise, Jr. ..... | F16D 55/22655 |
| | | | 188/73.35 |
| 6,991,073 B2 * | 1/2006 | Macke ................... | F16C 29/02 |
| | | | 188/73.31 |
| 9,777,782 B2 | 10/2017 | De Morais et al. | |
| 11,603,895 B2 * | 3/2023 | Thomas .............. | F16D 65/0068 |
| 2007/0215418 A1 * | 9/2007 | Wirth ................... | F16D 65/123 |
| | | | 188/218 XL |
| 2014/0116817 A1 | 5/2014 | Morais et al. | |

FOREIGN PATENT DOCUMENTS

| | | |
|---|---|---|
| CN | 215861437 U | 2/2022 |
| DE | 2705788 | 8/1977 |
| DE | 102008027049 | 12/2009 |
| JP | 2009-127646 | 6/2009 |
| JP | 2018-128100 | 8/2018 |

* cited by examiner

BRAKE CALIPER ASSEMBLY HAVING GUIDE PIN WITH NON-CIRCULAR CROSS-SECTION

CROSS-REFERENCE TO RELATED APPLICATION

This application is based on and claims priority under 35 U.S.C. § 119 to German Patent Application No. 102023103289.5, filed on Feb. 10, 2023 in the German Patent and Trade Mark Office, the disclosures of which are incorporated herein by reference.

The invention concerns a brake caliper assembly for a vehicle disc brake and a guide pin for such a brake caliper assembly. The vehicle may in particular be a motor vehicle and/or a road vehicle. For example, the vehicle may be a car, a truck or a bus.

Brake caliper assemblies and in particular floating brake calipers are known and established in the prior art. They generally serve to position and move brake pads relative to a rotating brake disc to produce a braking effect. An example of an existing brake caliper assembly can be found in U.S. Pat. No. 9,777,782 B1.

The above prior art example shows the established principle of a floating brake caliper housing comprising guide pins. These guide pins are rigidly coupled to the brake caliper housing. Typically, they are mechanically fixed to the brake caliper housing. The guide pins form elongated protrusions, e.g. in form of cylindrical shafts. They are each received in a guiding recess of a brake pad carrier. The brake pad carrier is often non-movable relative to the brake disc and e.g. fixed to an axle knuckle. The floating brake caliper housing, to the contrary, is often movable relative to the brake disc and to the brake pad carrier.

In sum, this means that the guide pins guide a relative movement between the brake pad carrier and brake caliper housing and are so far fixed to the movable component, i.e. to the brake caliper housing.

Also, the guide pins are typically designed as bolt-like cylindrical members having massive circular cross-sections. The circular cross-sections are chosen for ease of manufacturing, but also to provide substantially uniform contact conditions and thus sliding conditions along the circumference of the guide pins.

While respectively designed brake caliper assemblies are accompanied with various advantages, there remains room for improvement. For example, it is desirable to limit the weight of existing brake caliper assemblies, while ensuring a reliable and stick-free guidance of the floating caliper movements. The latter helps to enhance brake performance.

Therefore, it is an object of this invention to provide a brake caliper assembly having an improved brake performance at a limited weight.

This object is solved by the subject matter according to the attached independent claim 1. Advantageous embodiments are disclosed in this description, in the figures as well as in the dependent claims.

Accordingly, a brake caliper assembly for a vehicle disc brake is suggested. The vehicle disc brake comprises a brake disc that rotates about a rotation axis. The brake caliper assembly comprises:
- a brake caliper housing having a receiving section for a brake piston;
- a brake pad carrier that is configured to slidingly receive a pair of brake pads; and at least one guide pin that is configured to guide a relative movement between the brake caliper housing and the brake pad carrier;

wherein at least a first section of the guide pin has a cross-section comprising a main axis and a minor axis, wherein a dimension along the main axis is larger (e.g. longer) than a dimension along the minor axis. Also, an angle (which may also be 0°) enclosed by the main axis and a radial direction may be smaller compared to an angle (which may optionally not be 0°) enclosed by the minor axis and the radial direction.

Generally, the smallest angle that can be defined or that is enclosed between the respective one of the main axis and minor axis and the radial direction (or alternatively the below-discussed tangential direction) may be considered.

The brake caliper assembly may be a floating caliper assembly. The brake caliper housing may thus be slidingly connected to the brake pad carrier or, put differently, may be movable relative to and/or supported by the brake pad carrier. This may include the brake caliper housing being coupled to the brake pad carrier via the at least one guide pin. That is, the brake caliper housing may be supported by said guide pin, in particular so as to be axially displaceable along said guide pin.

The brake pad carrier, on the other hand, may be stationary (i.e. may be non-movable relative to the brake disc). It may be fixed to a vehicle component that is non-movable relative to the brake disc, such as an axle knuckle.

There may be more than one guide pin, in particular two guide pins which are preferably configured identically to one another. One of said guide pins may be positioned on a trailing side and the other may be positioned on a leading side of the brake caliper assembly (e.g. leading and trailing with respect to a forward rotation direction of the brake disc). When referring to only one guide pin herein, this does not exclude that at least a respective second guide may exist. On the other hand, when referring to two guide pins, this does not exclude that only one guide pin may be provided.

The guide pin may also be referred to as a rod. It may be or comprise an elongated member and/or have a longitudinal axis. The longitudinal axis of the guide pin may extend in parallel (or at an angle of less than 45°, in particular less than 20°) to the rotation axis of a brake disc that is braked by the brake caliper assembly. In one example, the guide pin has a straight shaft section and/or a cylindrical shaft section. At least a part (e.g. an axial section) of this shaft section may be received in a below-discussed guiding recess of the brake pad carrier. This cylindrical shaft section may comprise the first section of the guide pin having the non-uniformly dimensioned cross-section. In one example, said first section extends along the complete cylindrical shaft section, i.e. the complete cylindrical shaft section has a respective non-uniformly dimensioned cross-section.

The cross-sectional plane in which the cross-section of the guide pin is defined may extend orthogonally to the longitudinal axis of the guide pin. The first section comprising the non-uniformly dimensioned cross-section (i.e. the cross-section having the longer main axis and shorter minor axis) may extend along the longitudinal axis.

The dimension of the cross-section along the main axis may be the largest dimension of the cross-section. The dimension of the cross-section along the minor axis may be the smallest dimension of the cross-section. The dimension of the cross-section along the main axis may be at least 10% larger than, at least 25% larger, at least 50% larger than or more than twice as large as the dimension of the cross-section along the minor axis. This achieves the below discussed advantages in terms of an appropriate sizing of surface regions of the guide pin to compensate for forces acting thereon.

On the other hand, the dimension of the cross-section along the main axis may not be more than five times or may not be more than ten times the dimension of the cross-section along the minor axis. This helps to ensure compactness.

The radial direction may be defined with respect to the brake disc's rotation axis. It may thus extend radially relative to and/or from said rotation axis. Additionally or alternatively, the radial direction may intersect an axis connecting the guide pins, said axis e.g. extending orthogonally to the longitudinal axes of the guide pins. The radial direction with respect to which the angle to the main and minor axes is defined may intersect the guide pin. For example, a radial direction may be considered that extends through a geometric centre of the guide pin and/or through a point where the main axis and minor axis intersect one another.

Additionally or alternatively to the angle enclosed between each of the main axis and minor axis and the radial direction, an angle enclosed between each of the main axis and minor axis and a tangential direction may be considered. The tangential direction may extend along a circumference of the brake disc and/or orthogonally to a radial direction discussed above. Additionally or alternatively, it may correspond to and/or indicate a rotation direction of the brake disc. Additionally or alternatively, the tangential direction may extend in parallel to or coincide with an axis tangentially touching an outer circumference of the brake disc. Accordingly, the tangential direction may optionally not necessarily touch the brake disc's circumference itself, but may preferably extends in parallel to a respective tangent.

In one example, the minor axis coincides with or extends in parallel to a tangential direction (e.g. the tangential direction with respect to which the above angle is defined). Additionally or alternatively, the main axis may coincide with or extend in parallel to a radial direction (e.g. the radial direction with respect to which the above angle is defined).

The minor axis may enclose a smaller angle with a tangential direction compared to the main axis (i.e. compared to an angle enclosed between the main axis and said tangential direction). The angle between the minor axis and tangential direction may be 0° or between 0° and 45°, e.g. up to 25°. In particular in connection with this angle, a tangential direction may be considered which intersects a radial direction with respect to which the above-discussed alternative angle is defined (e.g. between the main axis and the radial direction). Additionally or alternatively, a tangential direction may be considered that coincides with or extends in parallel to a tangent touching a circumference of the brake disc at a position adjacent to or radially above or below the guide pin. For example, the tangential direction and the guide pin may at least partially be comprised by a common angular section of e.g. the brake disc, said angular section e.g. including up to 20° or up to 40°.

Any of the orientations of the main axis and minor axis disclosed herein with respect to the tangential direction or radial direction ensure that a larger region of the guide pin faces towards the largest share of contact forces that act on the guide pin. When braking large forces are transmitted from the brake disc to the brake pads and from there to the brake pad carrier, the brake pad carrier resting against the guide pins. This way, large forces are exerted onto the guide pin which are for the most part directed in a tangential direction and/or orthogonally to a radial direction.

With the presently disclosed cross-section, the guide pin receives said forces with a face or a portion of its outer circumference having a comparatively large area. Put differently, the presently disclosed cross-section of the guide pin provides a noncircular and/or non-rotationally symmetric shape, e.g. an elliptic shape. Thus, its outer circumferential surface has differently sized portions facing in a radial direction and in a tangential direction.

For example, a surface region of the guide pin when projected into a plane extending orthogonally to a tangential direction may be larger than a surface region of the guide pin projected into a plane extending orthogonally to a radial direction. It may e.g. be at least 25% or at least 50% larger or even at least twice as large.

In still other words, by orienting the larger dimensioned main axis of the cross-section in the presently disclosed manner, a respectively larger surface region of the guide pin is oriented so as to face the tangential direction and a respectively smaller surface region of the guide pin is oriented to face the radial direction. This means that the size of the surface portions is adjusted to the expected tangential and radial distribution of the forces acting on the guide pin.

Apart from generally improving rigidity and reliability of the guide pin in this manner, this also allows to reduce the total surface area and thus size and mass of the guide pin compared to a circular cross-section. Alternatively, it allows to essentially maintain the same surface area and/or size and/or mass of the guide pin compared to a circular design, but at a higher stiffness and stability. In sum, the present solution may increase strength and robustness of the guide pin and thus reliability of the sliding connection enabled by the guide pin, without necessarily increasing the size and weight of the brake caliper assembly. This may also help to limit stick-slip effects and vibrations.

The cross-section of the first section of the guide pin may be mirror symmetric with respect to at least one of the main axis and the minor axis.

According to one example, the angle between the main axis and the radial direction is 0° or is between 0° and 45°, e.g. not more than 25°. As described above, this enables a suitable orientation of the non-uniformly sized cross-section according to the forces acting on the guide pin.

In one embodiment, the cross-section is non-circular. Instead, it may be elliptic and/or elongated (e.g. along the main axis). Additionally or alternatively, it may be rounded to limit local stresses. For example, the elliptic shape helps to avoid sharp edges (both of the guide pin as well as in a guiding recess receiving said guide pin) and/or local stress concentrations. This improves robustness of the brake caliper assembly. In case of an elliptic cross-section, the elliptic main axis may correspond to the main axis of the cross-section and the elliptic minor axis may correspond to the minor axis of the cross-section.

According to a further aspect, the guide pin is mounted to one of the brake caliper housing and the brake pad carrier. The first section of the guide pin (having the non-uniformly dimensioned cross-section) may be received in a guiding recess of the respective other of the brake caliper housing and the brake pad carrier. The guiding recess may e.g. be a bore, a cavity, a blind hole or a through hole. It may have a cylindrical shape. In one example, the guiding recess is an elongated hole.

The guide pin and/or the guiding recess may extend axially. Their longitudinal axes may coincide with one another. There may be exactly two guiding recesses (and two guide pins). One may be positioned at a leading edge and one at a trailing edge of the brake caliper assembly.

Generally, a shape and in particular a (inner) cross-section of the guiding recess may correspond to a shape and in particular (outer) cross-section, respectively, of the guide pin. Accordingly, in one embodiment, a cross-sectional shape of the guiding recess matches a cross-sectional shape of the first section of the guide pin, said first section e.g. being received or receivable in said guiding recess (e.g. along its entire length). The matching cross-sectional shapes ensure a particularly reliable guidance of the guide pin by the guiding recess.

In one embodiment, the first section of the guide pin (i.e. the section having the non-uniformly dimensioned cross-section) has at least one protrusion. The protrusion may e.g. extend within the plane of the cross-section and/or radially with respect to the longitudinal axis of the guide pin. The protrusion may cover an angle and/or circumferential sector of the cross-section. This angle and/or circumferential sector may e.g. be between 5° and 100°, e.g. between 20° and 90°. In one example, a plurality of respective protrusions is provided. These may be regularly spaced from one another or, in other words, may be regularly distributed in a circumferential direction of the cross-section.

The at least one protrusion may be used to limit a relative rotation of the guide pin and the guiding recess, e.g. about the longitudinal axis of the guide pin.

In one example, the guiding recess comprises a recess for receiving the protrusion. The recess of the protrusion may be similarly shaped, e.g. the shape of the recess resembling a negative shape the protrusion. Additionally or alternatively, the recess and the protrusion may define a form fit and/or engage one another. This may include forming a lock that prevents a relative rotation between these structures, e.g. about the guide pin's longitudinal axis.

In case a plurality of protrusions is provided, the guiding recess may comprise a plurality of recesses for receiving each of these protrusions in one of said recesses. The protrusions and/or the recesses of the guiding recess may extend along at least half of, along at least three quarters of and/or along the complete length of the guide pin and guiding recess, respectively.

It may also be provided that protrusions (according to any of the above examples) are provided at the guiding recess and that recesses (according to any of the above examples) are provided at the guide pin. Also, mixed configurations may be provided with each of the guiding recess and guide pin comprising protrusions as well as recesses.

According to one example the cross-section the first section is hollow. This helps to reduce weight of the brake caliper assembly.

Alternatively, the cross-section of the first section is filled or, in other words, is massive and/or non-hollow. This improves stiffness of the guide pin, which may e.g. help to limit vibrations and/or the size of the guide pin.

The invention also concerns a guide pin for a brake caliper assembly according to any of the aspects disclosed herein. The guide pin may be configured according to any of the examples disclosed in connection with the brake caliper assembly. Specifically, the guide pin may have a cross-section (e.g. extending orthogonally to the longitudinal axis of the guide pin), the cross-section comprising a main axis and a minor axis, wherein a dimension of the cross-section along the main axis is larger than along the minor axis. Further, the guide pin is arrangeable in or at a brake caliper assembly according to any of the aspects disclosed herein, so that an angle enclosed by the main axis and a radial direction is smaller (and/or an angle enclosed by the main axis and a tangential direction is larger) compared to an angle enclosed by the minor axis and the radial direction (respectively the tangential direction).

Embodiments of the invention are discussed below with respect to the attached schematic figures. Throughout the figures, same or similar features may be marked with the same reference signs.

Figure 1:
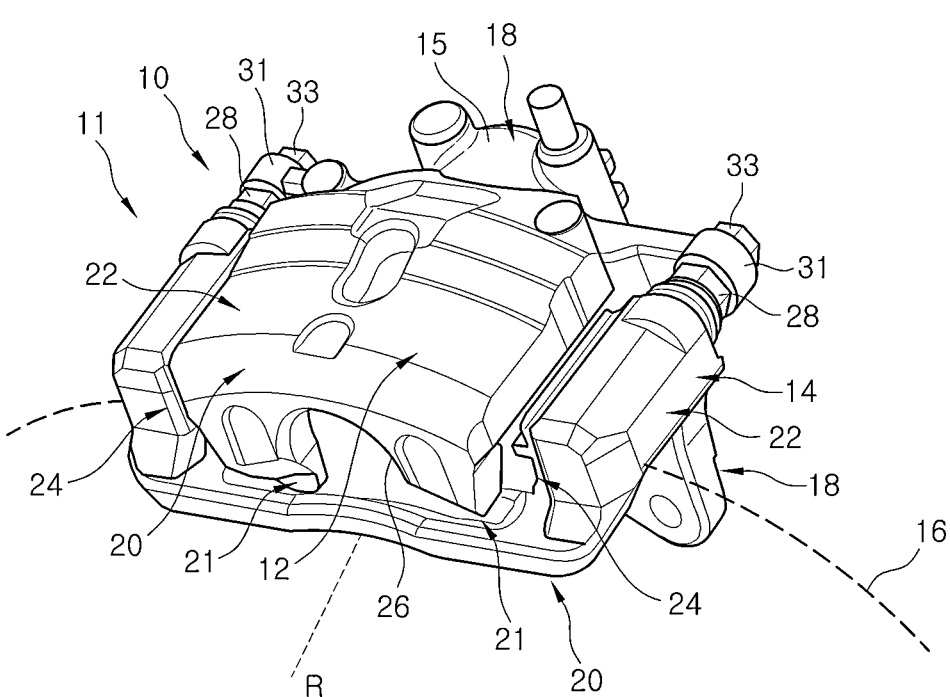
FIG. 1 shows a brake caliper assembly according to an embodiment of this invention.

FIG. 1 shows a brake caliper assembly 10 of a vehicle disc brake 11, the brake caliper assembly 10 being configured according to generally known floating caliper principles. It comprises a brake caliper housing 12 that is slidingly supported by a stationary brake pad carrier 14.

The brake caliper assembly 10 is generally configured to press brake pads 26 (one of which is partially visible in FIG. 1) against a brake disc 16. The brake pads 26 are received in and guided by the brake pad carrier 14. Only part of an outer circumferential edge of the brake disc 16 is indicated by a dashed line in FIG. 1, the brake disc 16 generally being configured according to known examples. Further, a rotation axis R about which the brake disc 16 rotates is schematically indicated by a dotted line in FIG. 1.

The brake caliper housing 12 comprises a receiving section 15. Only an outer wall of said receiving section 15 is visible in FIG. 1 and the receiving section 15 is formed as an (non-visible) open cylindrical cavity. In said receiving section 15, a non-illustrated brake piston is received.

The brake caliper housing 12 comprises a piston side 18 located at a first side face of the brake disc 16 and specifically at the same side face as the receiving section 15. Further, the brake caliper housing 12 comprises a finger side 20 located at the respective opposite side face of the brake disc 16 compared to the piston side 18. The finger side 20 comprises (merely as an example) two finger portions 21 according to known configurations.

The finger side 20 and the piston side 18 are connected to one another by a bridge section 22. The bridge section 22 overlaps with the outer circumferential surface of brake disc 16 or, put differently, axially spans across the brake disc 16 and/or extends from one of the side faces of said brake disc 16 to the other.

Figure 2:
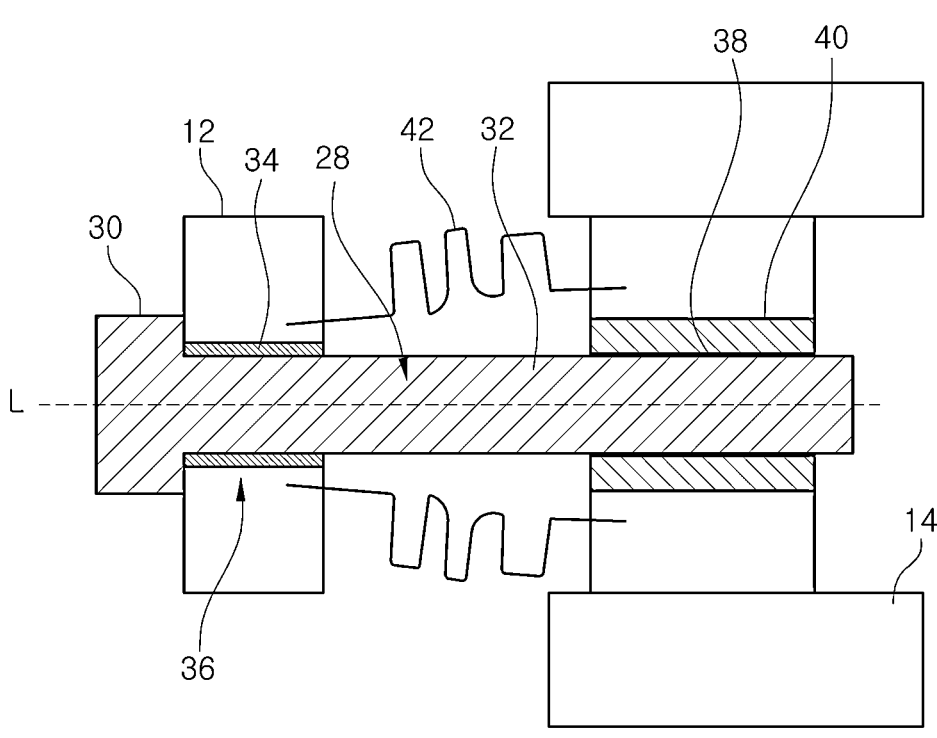
FIG. 2 is a partial sectional view of a brake caliper assembly according said another embodiment of this invention.

In a generally known manner, the brake piston received in the receiving section 15 and the inside of the finger portions 21 that face away from the viewer in FIG. 2 are configured to rest against the brake pads 26 and to press them against the brake disc 16.

Just like the brake caliper housing 12, the brake pad carrier 14 comprises a piston side 18, a finger side 20 and a bridge section 22.

Guiding grooves 24 are provided at an inner side of the bridge section 22 for slidingly receiving the two brake pads 26, one of said guiding grooves 24 being partially visible in FIG. 1. The brake pads 26 are located on opposite side faces of the brake disc 16. The brake pads 26 are generally identical to one another, but are oriented differently to face the different side faces of the brake disc 16.

FIG. 1 also illustrates that the movable brake caliper housing 12 is slidingly supported by and guided relative to the brake pad carrier 14 by means of guide pins 28 at both of a trailing side and leading side of the brake caliper assembly 10.

According to the configuration of FIG. 1, the guide pins 28 are each received in a non-illustrated cylindrical blind hole in the brake pad carrier 14. An axial length of said blind holes exceeds that of the guide pins 28, so that the latter may axially slide back and forth within the blind holes.

The guide pins 28 are secured to the brake caliper housing 12 by means of a screw connection. Specifically, fixing projections 31 are provided at each of a trailing side and a leading side of the brake caliper housing 12, said fixing projections 31 each comprising a non-visible through-hole. A guide pin 28 is aligned with each of said through holes to engage with a locknut 33 provided at an opposite side of the fixing projections 31. This way, the guide pins 28 are mechanically fixed to the fixing projections 31 and thus to the brake caliper housing 12.

FIG. 2 is a sectional view of a part of a brake caliper assembly 10 of FIG. 1 showing one of the guide pins 28 and a connection formed thereby. The guide pin 28 is configured as a one-piece metallic member. Specifically, the guide pin 28 is configured as a bolt-like member. The guide pin 28 has an optional head portion 30 and an elongated shaft portion 32. The shaft portion 32 extends in parallel to the rotation axis R of the brake disc 16 and along a longitudinal axis L of the guide pin 28.

The guide pin 28 is inserted into a through hole 34 provided in the brake caliper housing 12. This is done in such a manner that the head portion 30 of the guide pin 28 acts a stop member by resting against a surface of the brake caliper housing 12. The shaft portion 32 extends towards the brake pad carrier 14 and reaches into a guiding recess 38 provided therein. At least a section of the shaft portion 32 that is adjacent to the head portion 30 is threaded. The through-hole 34 is likewise threaded. Accordingly, a screw connection is formed between the guide pin 28 and the through hole 34, thereby mechanically fixing the guide pin 28 to the brake caliper housing 12. As a result, the guide pin 28 is non-movable relative to the brake caliper housing 12.

FIG. 2 shows an optional alternative configuration in which the guiding recess 38 of the brake pad carrier 14 is configured as a through-hole instead of a blind hole (see above discussion of FIG. 1). The guiding caliper housing 12. An inner cross-sectional shape of the guiding recess 38 corresponds to an outer cross-sectional (i.e., circumferential) shape of the guide pin 28 and more specifically of the guide pin's shaft portion 32. Accordingly, the guiding recess 38 receives and surrounds at least one axial section of the guide pin 28.

As another optional feature, an elastic member 40 in form of a plastic or rubber bushing is inserted into the guiding recess 38. The elastic member 14 surrounds and contacts the guide pin 28. Accordingly, the guide pin 28 directly rests against the elastic member 40 and slides along its inner surface.

Such a relative movement occurs when the brake caliper housing 12 is displaced according to known floating caliper principles. In this case, the brake caliper housing 12 slides along the shaft portion 32 of the guide pin 28 and thus relative to the brake pad carrier 14 and the optional elastic member 40 (that is pressed into the guiding recess 38, thereby not being movable relative to the brake pad carrier 14).

FIG. 2 also shows a flexible and in particular elastically deformable dust protection sleeve 42 whose axial end portions are fixed to each of the brake caliper housing 12 and brake pad carrier 14. The flexible and in particular elastic deformation may occur during the sliding movement of the brake caliper housing 12 relative to the brake pad carrier 14. The dust protection sleeve 42 is an optional member and may be omitted.

In the examples above, the guide pins 28 have a non-uniformly dimensioned cross-section along the entire length of their shaft sections 32. Accordingly, said shaft sections 32 resemble first sections of the guide pins 28 in the sense of this disclosure.

Figure 3:
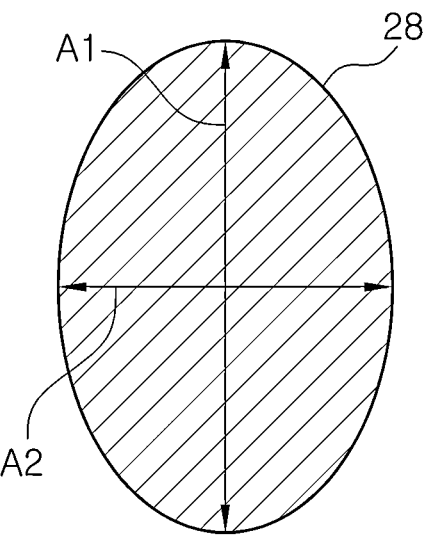
FIG. 3 is a cross sectional view of a guide pin of the brake caliper assembly of FIG. 1.

FIG. 3 illustrates a filled and non-hollow cross-section of the guide pins 28 with the cross-sectional plane extending orthogonally to the longitudinal axis L (see FIG. 2). The cross-section is rounded, but not circular. Rather, it is elliptic. Accordingly, it has a largest dimension extending along a main axis A1 and a smallest dimension extending along a minor axis A2. The main axis A1 and minor axis A2 extend orthogonally to one another.

Figure 4:
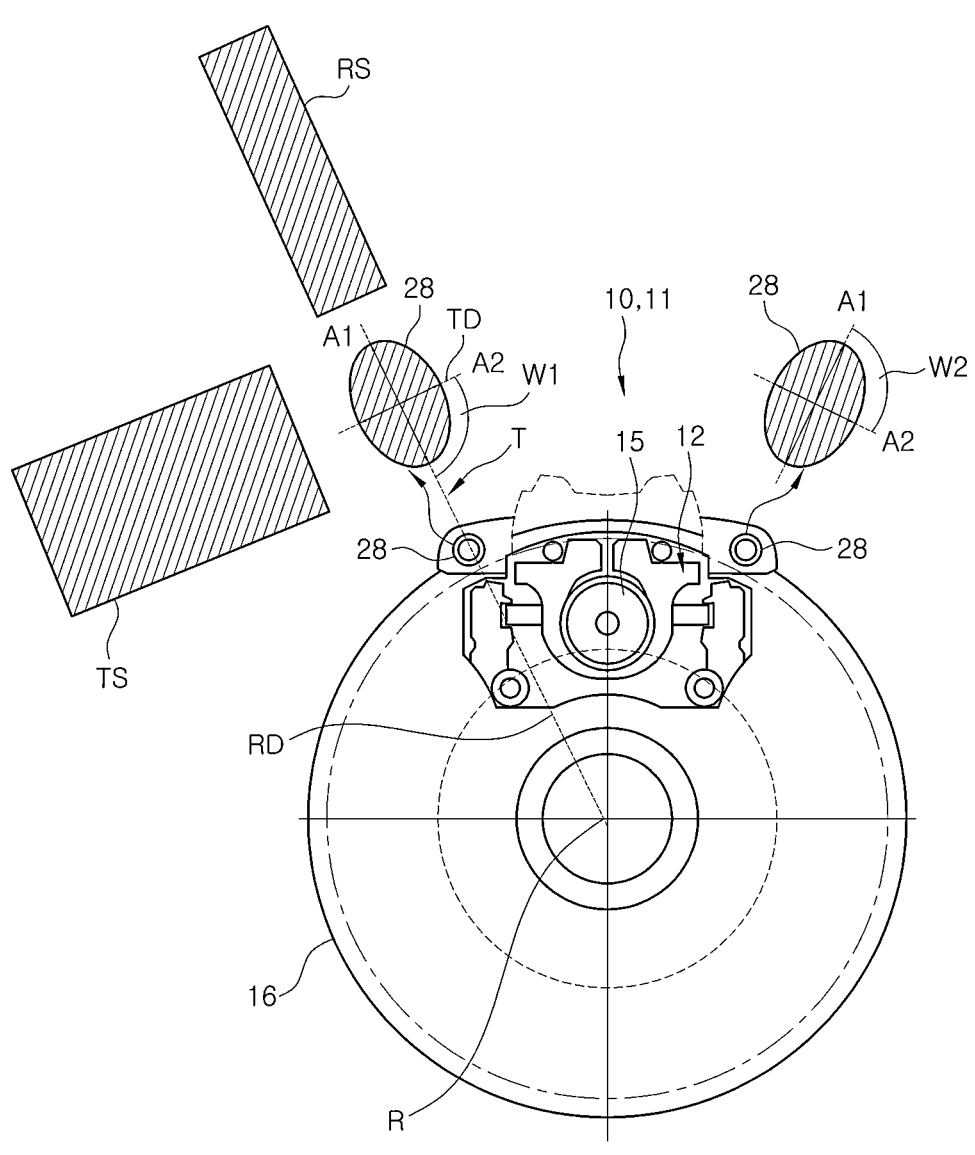
FIG. 4 is another view of the brake caliper assembly of FIG. 1 and of a vehicle disc brake comprising the same, said figure including enlarged detail views of the guide pin's cross-section and of its projected surface regions.

FIG. 4 illustrates how this cross-section and specifically its main axis A1 and minor axis A2 are oriented within the brake caliper assembly 10 and within the overall vehicle disc brake 11. The brake caliper assembly 10 of FIG. 4 is illustrated only schematically and configured according to FIG. 1. A rear of the brake caliper housing 12 faces the viewer with the receiving section 15 being visible. Possible deviations between illustration of the brake caliper assembly 10 in FIG. 4 and its illustration in FIG. 1 are due to the schematic nature of FIG. 4 and are of no relevance.

In FIG. 4, the rotation axis R of the brake disc 16 extends orthogonally to the image plane. The positions of both guide pins 28, whose non-illustrated longitudinal axis equally extend orthogonally to the image plane, are indicated in FIG. 4.

FIG. 4 also includes detailed enlarged views of the cross-sections of said guide pins 28. These detailed views show how the guide pins 28 are oriented within the brake caliper assembly 10. Again, the main axis A1 and minor axis A2 are shown for each guide pin 28.

First referring the left guide pin 28 and its cross-section, the main axis A1 coincides with a radial direction RD. Said radial direction RD extends from the rotation axis R of the brake disc 16 end runs in parallel to and/or within a plane of said brake disc 16. Further, it intersects the guide pin 28 and in particular a geometric centre of the cross-section as well as a point of intersection of the main axis A1 and the minor axis A2.

Accordingly, the main axis A1 encloses an angle with said radial direction RD of 0°. On the other hand, the minor axis A2 encloses an angle W1 with the radial direction RD of 90°. Therefore, the angle W1 between the minor axis A2 and said radial direction RD is larger than a respective angle between the main axis A1 and said radial direction RD.

A tangential direction TD is also shown. This direction extends in parallel to a non-illustrated tangent at the circumference of the brake disc 16, said tangent intersecting the radial direction RD.

In consequence, this means that a face or surface region of the guide pin 28 extending along the main axis A1 faces in a tangential direction T. On the other hand, a face or surface region of the guide pin 28 extending along the minor axis A2 faces in a radial direction.

FIG. 4 includes schematic illustrations of the respective surface regions. These illustrations correspond to top views (radially facing surface region RS) and to side views (tangentially facing surface region TS) of the guide pin 28. In other words, a radially facing surface region RS corresponds to a surface region of the guide pin 28 when projected into a plane extending orthogonally to the radial direction RD. The tangentially facing surface region TS, on the other, corresponds to surface region of the guide pin 28 when projected into a plane extending orthogonally to the tangential direction TD. It can thus be seen that the tangentially facing surface region TS a substantially larger than the radially facing surface region RS.

In sum, this means that the guide pin 28 possesses more strength to withstand tangentially acting forces compared to radially acting forces. This, however, corresponds to the main stresses and forces experienced by the guide pin 28. Specifically, when braking, the brake pad carrier 14 rests with significant forces against the tangentially facing surface region TS of the guide pin 28 and with substantially smaller forces against the radially facing surface region RS of the guide pin 28.

With the suggested design of the guide pin 28 and specifically with its non-uniformly dimensioned and non-circular cross-section, the guide pin 28 is adjusted to this main load case without, however, having to increase its overall volume and/or size. Rather, compared to a circular design, the radially facing surface region RS can be reduced to instead enlarge the tangentially facing surface region TS.

With respect to the cross-section of the right guide pin 28 in FIG. 4, an alternative definition of its orientation is discussed. In this case, it is shown that the main axis A1 encloses a large angle of 90° with a tangential direction TD. In the shown example, said tangential direction TD coincides with the minor axis A2. Accordingly, the minor axis A2 encloses a significantly smaller angle of 0° with said tangential direction TD.

Figure 5:
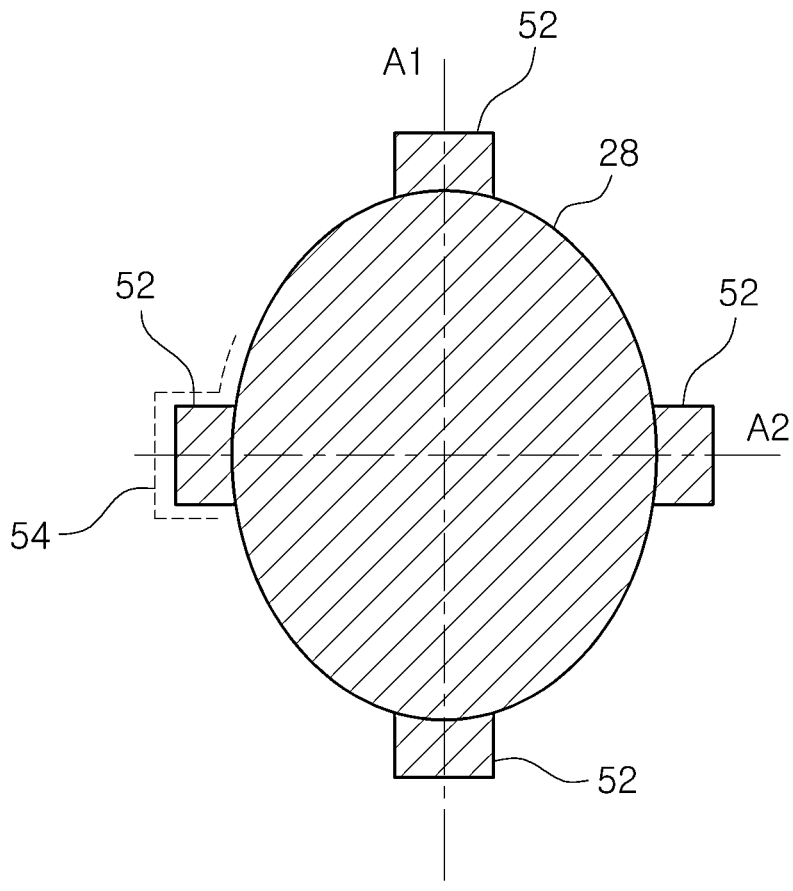
FIG. 5 is a cross sectional view of a guide pin similar to FIG. 3 but according to another embodiment of the invention.
Figure 6:
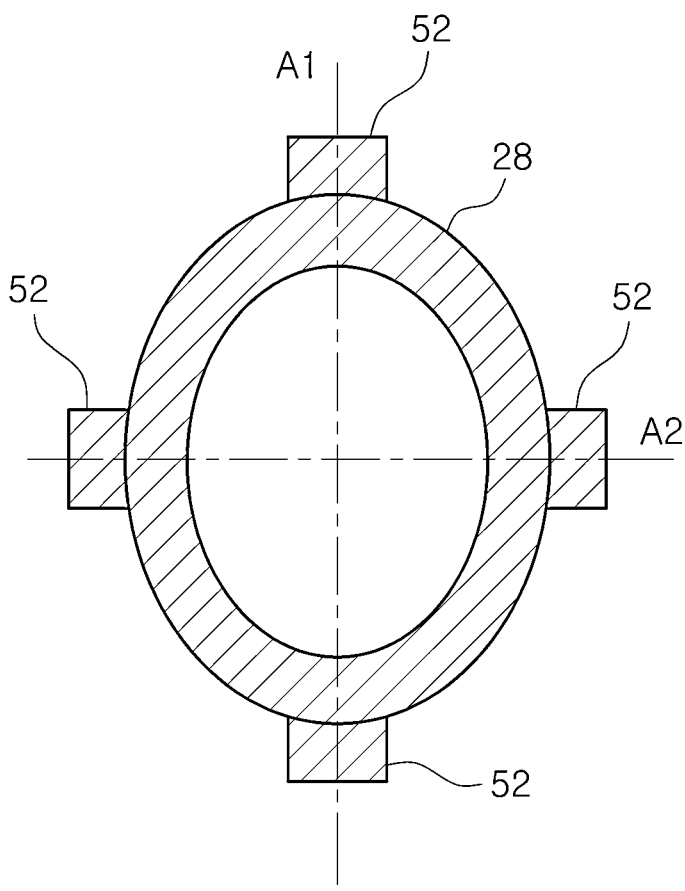
FIG. 6 is a cross sectional view of a guide pin similar to FIG. 3 but according to still another embodiment of the invention.

FIGS. 5 and 6 show alternative designs of the guide pin 28 and specifically of its non-circular cross-section. Again, said cross-section has a substantially elliptic shape with the dimensions along the main axis A1 and minor axis A2 corresponding to the previous example. Yet, in these cases protrusions 52 are additionally provided at the outer circumference of the cross-section. These protrusions 52 extend along the complete length of the first section of the guide pin 28 having the respectively shaped elliptic cross-section. The protrusions 52 extend radially, i.e. form radially enlarged portions all projections. They cover a comparatively small section of the circumference of the guide pin 28, e.g. an angular section of 20° or less. They are regularly distributed along the circumference of the guide pin 28, so that the four depicted protrusions 58 are spaced apart from one another by approximately 90°.

The guide pin 28 of FIG. 5 has a filled, non-hollow cross-section to increase its strength at a limited size. The guide pin 28 of FIG. 6 has a hollow cross-section to reduce weight.

To accommodate the protrusions 52, a non-illustrated guiding recess 38 receiving the guide pin 28 has correspondingly shaped and correspondingly positioned recesses 54. The position of one exemplary recess 54 is schematically indicated in FIG. 5. This way, an engagement with the protrusions 52 can be formed, e.g. securing the guide pin 28 against rotations about its longitudinal axis L. This e.g. reduces vibrations.

10

LIST OF REFERENCE SIGNS 10 brake caliper assembly
11 vehicle disc brake
12 brake caliper housing
14 brake pad carrier
15 receiving section
16 brake disc
18 piston side
20 finger side
21 finger portion
22 bridge section
24 guiding groove
26 brake pad
28 guide pin
30 head portion
31 fixing projection
32 shaft portion
33 lock nut
34 through-hole
36 threaded section
38 guiding recess
40 elastic member
41 elastic section
42 dust protection sleeve
52 protrusion
54 recess
A1 main axis
A2 minor axis
L longitudinal axis
R rotation axis
RD radial direction
RS radially facing surface region
TD tangential direction
T tangent/tangential axis
TS tangentially facing surface region
W1 angle
W2 angle

The invention claimed is:

1. A brake caliper assembly for a vehicle disc brake, the vehicle disc brake comprising a brake disc that rotates about a rotation axis, the brake caliper assembly comprising:
a brake caliper housing having a receiving section for a brake piston;
a brake pad carrier that is configured to slidingly receive a pair of brake pads; and
at least one guide pin that is configured to guide a relative movement between the brake caliper housing and the brake pad carrier;
wherein at least a first section of the guide pin has a cross-section comprising a main axis and a minor axis, wherein a dimension of the cross-section along the main axis is larger than along the minor axis,
wherein an angle enclosed by the main axis and a radial direction is smaller compared to an angle enclosed by the minor axis and the radial direction, and
wherein the first section of the guide pin has a protrusion.
2. The brake caliper assembly of claim 1,
wherein the guide pin is mounted to one of the brake caliper housing or the brake pad carrier, and
wherein the first section of the guide pin is received in a guiding recess of another of the brake caliper housing or the brake pad carrier.
3. The brake caliper assembly of claim 2,
wherein a cross-sectional shape of the guiding recess matches the cross-sectional shape of the first section of the guide pin.

4. The brake caliper assembly of claim 2, wherein the guiding recess comprises a recess for receiving the protrusion.

5. The brake caliper assembly of claim 1, wherein the angle between the main axis of the radial direction is 0° or between 0° and 45°.

6. The brake caliper assembly of claim 1, wherein the cross-section is elliptic.

7. The brake caliper assembly of claim 1, wherein the cross-section of the first section is hollow.

8. The brake caliper assembly of claim 1, wherein the cross-section of the first section is filled.

9. A guide pin for a brake caliper assembly according to claim 1.

* * * * *